(12) United States Patent
Urmson

(10) Patent No.: US 7,331,267 B2
(45) Date of Patent: Feb. 19, 2008

(54) APPARATUS AND METHOD OF CUTTING A WORK PIECE

(76) Inventor: James F. Urmson, 25410 McDowell Ct., Sorrento, FL (US) 32776

( * ) Notice: Subject to any disclaimer, the term of this patent is extended or adjusted under 35 U.S.C. 154(b) by 489 days.

(21) Appl. No.: 11/096,634

(22) Filed: Mar. 31, 2005

(65) Prior Publication Data

US 2006/0219073 A1  Oct. 5, 2006

(51) Int. Cl.
  *B23D 19/00* (2006.01)
  *B65G 13/06* (2006.01)
(52) U.S. Cl. .................... 83/651; 83/651; 83/474; 198/788
(58) Field of Classification Search .......... 83/646, 83/464, 523, 591, 76.1, 76.3, 651, 401, 202, 83/283, 426, 435, 428, 474, 472, 466.1; 198/624, 198/788, 608, 611, 613, 626.5, 861.1, 812
See application file for complete search history.

(56) References Cited

U.S. PATENT DOCUMENTS

| | | | | |
|---|---|---|---|---|
| 3,526,312 | A * | 9/1970 | Braas | 198/624 |
| 4,173,238 | A * | 11/1979 | Pryor et al. | 144/356 |
| 4,379,426 | A | 4/1983 | Thompson et al. | |
| 4,790,222 | A * | 12/1988 | Morgan | 82/1.3 |
| 5,353,910 | A * | 10/1994 | Harris et al. | 198/345.1 |
| 5,868,056 | A * | 2/1999 | Pfarr et al. | 83/578 |
| 5,934,164 | A * | 8/1999 | Whatley, Jr. | 83/471.1 |
| 5,943,239 | A * | 8/1999 | Shamblin et al. | 700/160 |
| 6,212,983 | B1 * | 4/2001 | Pyle | 83/34 |
| 6,615,100 | B1 * | 9/2003 | Urmson | 700/167 |
| 6,817,090 | B1 | 11/2004 | McAdoo et al. | |
| 6,892,615 | B1 * | 5/2005 | Ogden | 83/34 |
| 2004/0168886 | A1 * | 9/2004 | Quadracci et al. | 198/369.7 |

OTHER PUBLICATIONS

Alpine Engineered Products, Inc., ALS—Alpine Linear Saw, Aug. 8, 2003 Version, Alpine Engineered Products, Inc., Equipment Division, Grand Prairie, TX, USA.
Alpine Engineered Products, Inc., Alpine Equipment, Cutting Equipment / Home, Alpine Linear Saw (ALS), Alpine Engineered Products, Inc., Grand Prairie, TX, USA (http:www.alpineequip.com/Alpine_Linear-Saw.html), 1999-2004.

* cited by examiner

*Primary Examiner*—Ehud Gartenberg
*Assistant Examiner*—Bharat C Patel
(74) *Attorney, Agent, or Firm*—Beusse Wolter Sanks Mora & Maire, P.A.

(57) ABSTRACT

An apparatus for cutting a work piece is provided that includes a base frame with four upwardly extending supports defining a workflow path there between. A framework may be mounted to the base frame for supporting a rotatable carriage above the workflow path. A pair of parallel guide rails may be mounted to the rotatable carriage with a power saw movably mounted to the pair of parallel guide rails. A controller may be programmed for independently controlling rotation of the rotatable carriage and translation of the power saw along the pair of parallel guide rails to cut a work piece in a cutting zone area. The controller may be further programmed to control the vertical displacement of the power saw. A pair of opposing roller carriages may be movably mounted to hold a work piece in the cutting zone area. The controller may be programmed to simultaneously move the opposing roller carriages in response to rotation of the rotatable carriage.

12 Claims, 6 Drawing Sheets

APPARATUS AND METHOD OF CUTTING A WORK PIECE

FIELD OF THE INVENTION

This invention relates in general to automated machinery for cutting work pieces and in particular to an apparatus and method for automatically cutting pieces of lumber to predetermined lengths and making various angled cuts so they may be used as cord and web members of a roof truss.

BACKGROUND OF THE INVENTION

Automated sawing machines and systems are known and available for a wide range of applications. For example, there are many types of computer-controlled sawing systems that cut lumber into prescribed lengths and at various angles according to a cut list programmed or entered into the computer. Many wood structures are fabricated from components that are cut to various lengths using automated sawing machines with each component's end portions being cut at various angles. This allows for two or more components to be more easily joined together where they intersect with one another at different angles. For example, the web and chord components of wooden trusses are often cut and pre-assembled at a fabrication facility then transported to a construction site for roof structures.

Radial type saws are sometimes used for making cuts to form web and chord components. A typical radial arm saw is configured so that the cutting blade is fixed vertically in a position to cut through the board when the saw is translated from a withdrawn position, waiting to make the cut, to an extended position where the cut is completed. After making the cut, the saw must be pulled back into its withdrawn position so the blade is out of the board and the board may then be moved forward and another cut made. In this respect, a conventional radial arm saw must be translated forward and backward for each cut, which can be time consuming and not designed to optimize throughput.

SUMMARY OF THE INVENTION

An apparatus for cutting a work piece is provided that includes a base frame that may include four upwardly extending supports defining a workflow path there between. A framework may be mounted to the base frame for supporting a rotatable carriage carrying a power saw above the workflow path. A pair of parallel guide rails may be mounted to the rotatable carriage with the power saw movably mounted to the pair of parallel guide rails. A controller may be programmed for independently controlling rotation of the rotatable carriage and translation of the power saw along the pair of parallel guide rails to cut a work piece in a cutting zone area. The controller may be further programmed to control the vertical displacement of the power saw. A pair of opposing roller carriages may be movably mounted to hold a work piece in the cutting zone area. The controller may be programmed to simultaneously move the opposing roller carriages in response to rotation of the rotatable carriage.

DETAILED DESCRIPTION OF THE INVENTION

Figure 1:
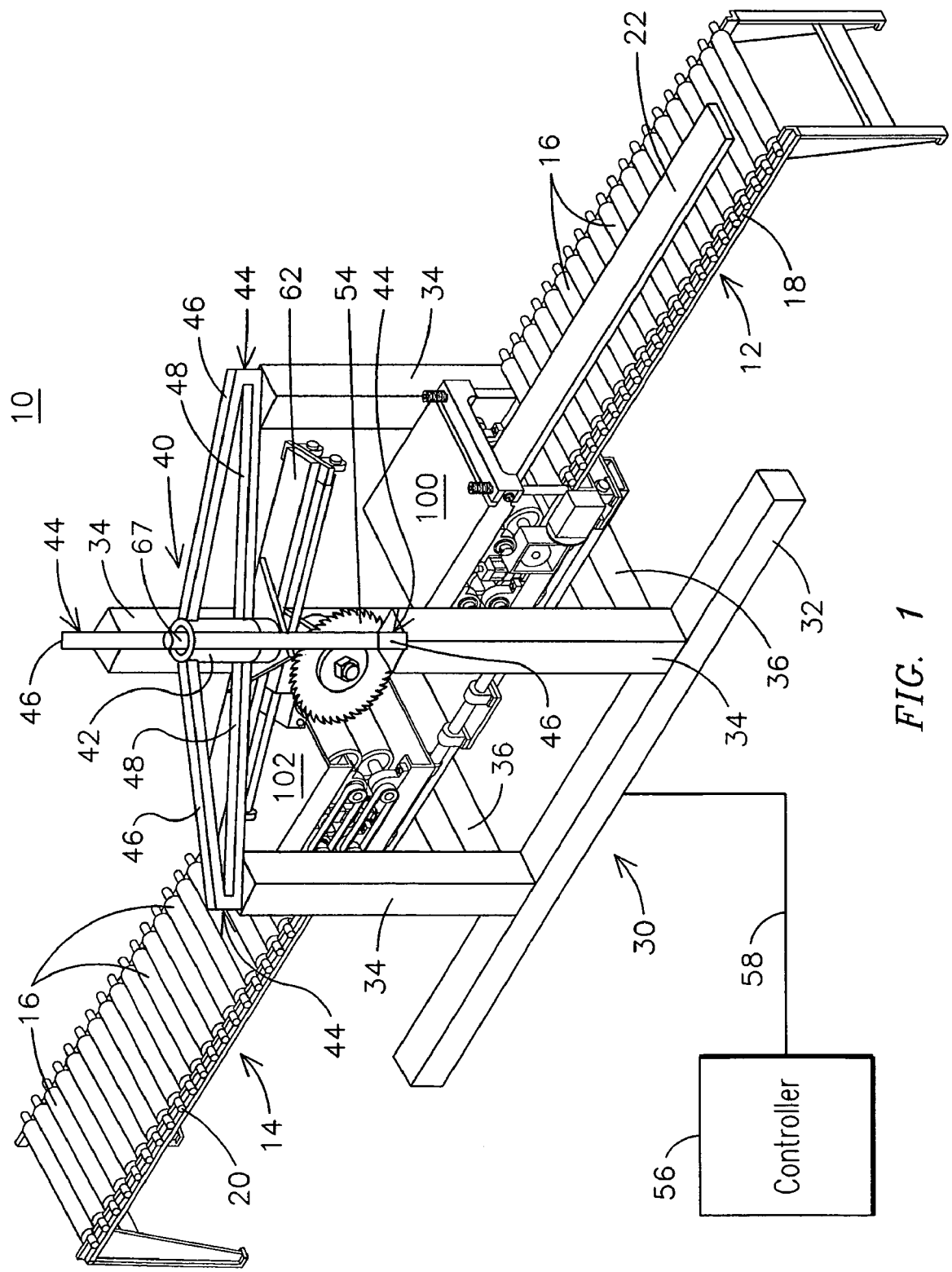
FIG. 1 is a perspective view of an exemplary system using an exemplary embodiment of the invention for cutting a work piece.

FIG. 1 is a perspective view of a sawing system 10 comprising an entrance roller table 12 and an exit roller table 14. Each table 12, 14 may include a respective plurality of rollers 16 rotatably mounted to entrance frame 18 and exit frame 20. This allows a work piece such as a piece of lumber or board 22 to be linearly fed into and out of a cutting zone area. It will be appreciated that embodiments of the invention may be used to cut work pieces of various composite materials. Any reference herein to cutting board 22 is for illustrative purposes only.

A base frame 30 may include a pair of opposing parallel rails 32 (one shown) that may be aligned in substantially parallel fashion with entrance and exit tables 12, 14. Two upright supports 34 may extend upwardly from each rail 32 and respective cross members 36 may span the distance between upright supports 34 on opposing sides of tables 12, 14 to connect base frame 30 together. The area between the opposing pair of two upright supports 34 may define a workflow path through which board 22 may be translated. It will be appreciated that base frame 30 may be fabricated of heavy gauge steel or other suitable material. It may also be sized to varying dimensions to accommodate work pieces of varying lengths and widths, and the length of cuts to be made in a work piece.

In an exemplary embodiment, a framework 40 comprising a cylindrical centerpiece 42 and four legs 44 that may extend symmetrically from centerpiece 42 and may be mounted on upright supports 34 of base frame 30. Each leg 44 may include an upper member 46 and a lower member 48. Upper members 46 may be connected at one end to an upper end of centerpiece 42 and at the other end to a respective lower member 48. Lower members 48 may be connected at one end to a lower end of centerpiece 42. It will be appreciated that framework 40 may be fabricated of heavy gauge steel or other suitable material and may be formed as an integral part of base frame 30 or as a separate component that is attached to base frame 30.

Figure 2:
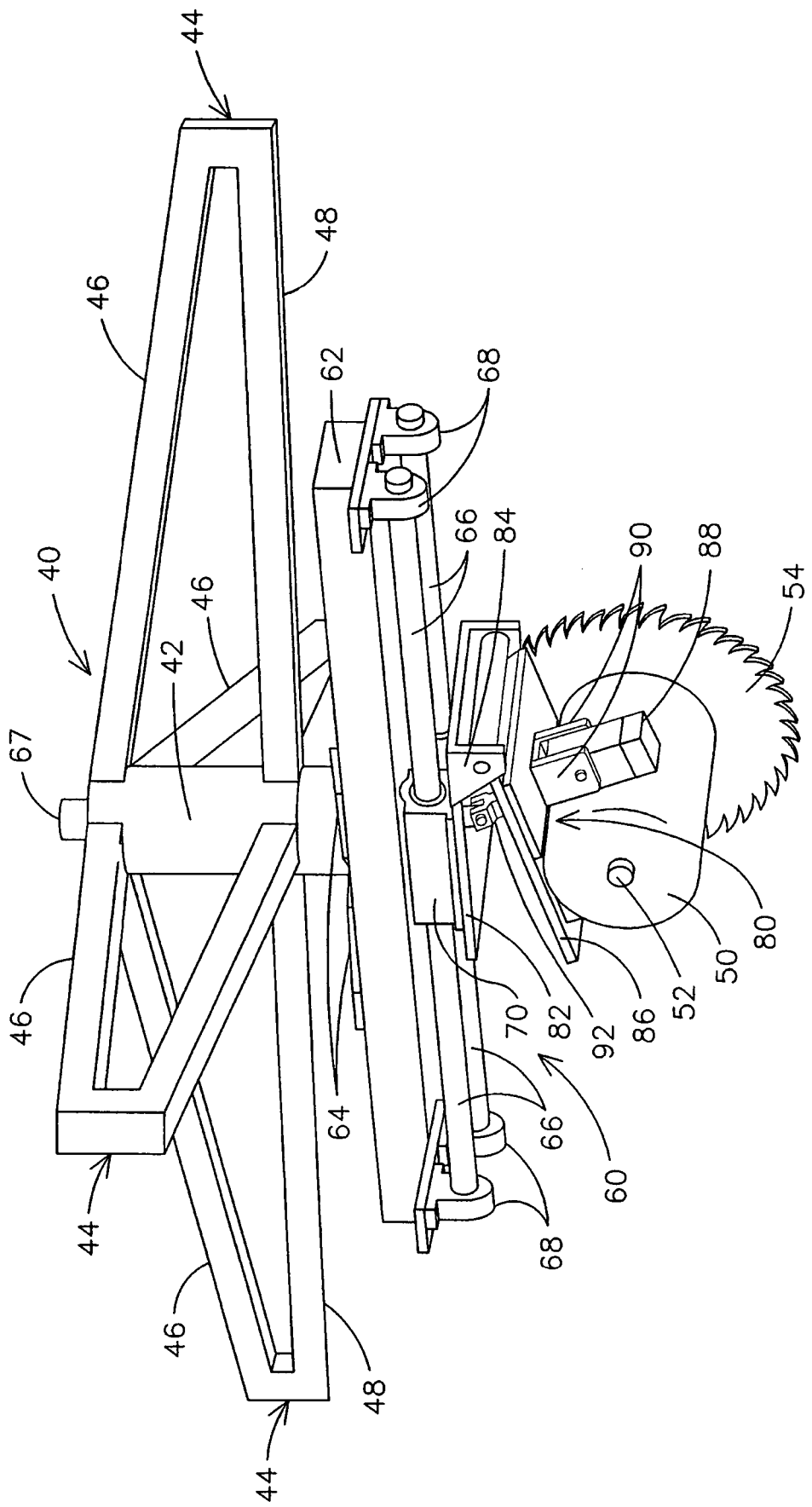
FIG. 2 is a perspective view of an exemplary saw carriage assembly of FIG. 1.

Referring to FIG. 2, framework 40 may be used to support a power saw 50 having a motor spindle 52 to which a cutting blade 54 may be mounted. Framework 40 may be of various configurations to suspend power saw 50 above the cutting zone area. Those skilled in the art will recognize that embodiments of the invention may use commercially available power saws 50 and cutting blades 54 having respective specifications suitable for cutting lumber that may be used as truss cord and web components. Other embodiments may use various power saws 50 and cutting blades 54 having specifications suitable for cutting various composite materials.

A controller 56 shown in FIG. 1, such as a conventional computer processor and databases may be provided for controlling various aspects of sawing system 10 in accordance with aspects of the invention. Controller 56 may be connected to sawing system 10 in a conventional manner such as through a data cable 58 (FIG. 1). Those skilled in the art will recognize that electrical power may be supplied to various components of sawing system 10 in a conventional manner.

In an embodiment, means 60 may be provided for linearly translating power saw 50 between a first position and a second position as best shown in FIG. 2. Means 60 may include a saw carriage 62 pivotally connected to framework 40 via mounting plate 64. Mounting plate 64 may be pivotally suspended within centerpiece 42 via a shaft 67 as recognized by those skilled in the art. The means 60 for linearly translating power saw 50 may include a pair of tubes or guide bars 66 suspended beneath saw carriage 62 via respective end brackets 68. Alternate embodiments allow for a single or plurality of tubes or guide bars 66 to be used.

A mount 70 may have two parallel cylindrical shafts for encasing respective guide bars 66 and in an embodiment may be a relatively flat servomotor mounted to guide bars 66. In this aspect, the means 60 for linearly translating power saw 50 may be pivotally mounted to framework 40. Controller 56 may be programmed for controlling the linear translation of power saw 50 along guide bars 66 via mount 70, which may be a servomotor. Controller 56 may be programmed for controlling the rotation of the linear translation means 60 so that power saw 50 may be rotated through approximately 360° about shaft 67. Embodiments of the invention allow for the power saw 50 to be translated linearly along guide bars 66 and rotated about shaft 67 simultaneously. Alternate means 60 for linearly translating power saw 50 will be recognized by those skilled in the art such as driving power saw 50 along one or more screw-type shafts or suspending power saw 50 in a slot or channel spanning saw carriage 62.

In an embodiment, means 80 may be provided for vertically displacing power saw 50 between a first position and a second position as best shown in FIG. 2. Means 80 may include a mounting plate 82 and a pair of lateral flanges 84 affixed to one end of plate 82. A pivot plate 86 may be pivotally mounted between lateral flanges 84 in a conventional manner such as mounting plate 86 to a trunnion fixed between lateral flanges 84. Power saw 50 may be mounted to pivot plate 86. A cylinder 88 may be mounted beneath pivot plate 86 via mounting brackets 90 and have a shaft 92 extending through an aperture in pivot plate 86. Shaft 92 may be connected to mounting plate 86.

A pneumatic cylinder 88 may be controlled by an output module responsive to controller 56 for translating power saw 50 between a first or non-cutting position and a second or cutting position. Controller 56 may be programmed to send a 24-volt signal to the output module as recognized by those skilled in the art. Pneumatic cylinder 88 may be connected with a compressed air supply (not shown) and be responsive to an I/O board in communication with controller 56. In an embodiment, power saw 50 may be vertically displaced approximately 4 inches measured at motor spindle 52. In the configuration of FIG. 2, power saw 50 and blade 54 will be vertically displaced through an arc defined by the size of pivot plate 86 and the position power saw 50 is attached to pivot plate 86. It will be appreciated that various arc angles may be defined depending on the length of desired vertical displacement and size of cuts to be made. In an alternate embodiment power saw 50 may be displaced linearly so it moves straight up and down. Those skilled in the art will recognize other means for vertically displacing power saw 50 such as using a piston or cylinder arrangement suspended from saw carriage 62.

Returning to FIG. 1, a pair of opposing roller carriages 100, 102 may be provided that may be linearly aligned with respective entrance and exit tables 12, 14. It should be understood that roller carriage 102 may be constructed and function in an identical or essentially identical manner to that of roller carriage 100 taking into account that in exemplary embodiments they may move in opposing relation to each other in accordance with aspects of the invention.

Figure 3:
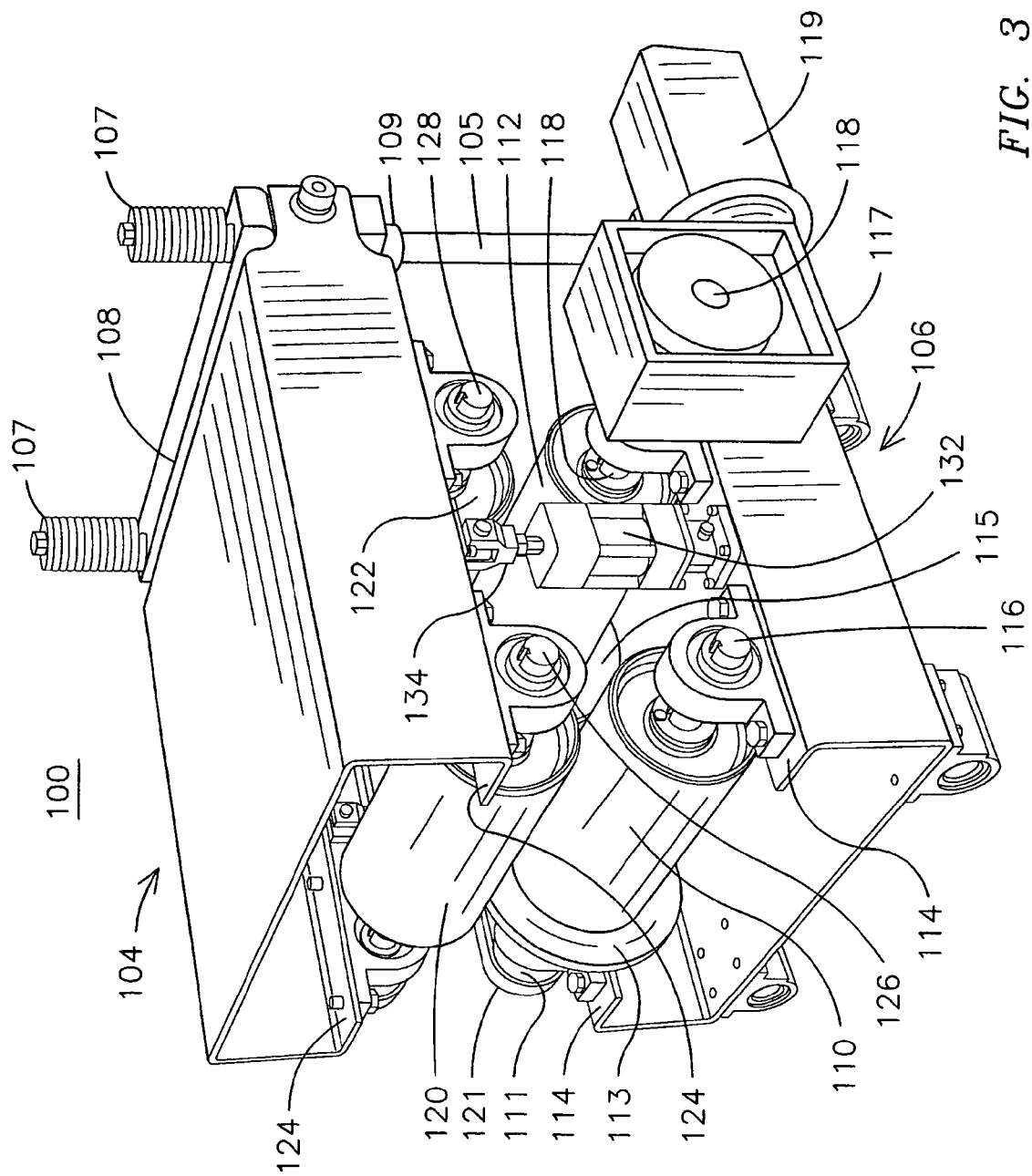
FIG. 3 is a perspective view of an exemplary roller carriage of FIG. 1.

FIG. 3 illustrates an exemplary roller carriage 100 that may include opposing upper and lower frames 104, 106 configured to support a plurality of rollers there between. Frames 104, 106 may be connected proximate one end thereof by a pair of respective rods 105 extending upwardly through an end brace 108 spanning the width of upper frame 104. Each rod 105 may have a respective coil spring 107 placed over its upper end, which may be contained on rod 105 with a washer and nut. Frame 104 may be prevented from sliding too far down rods 105 by a respective stopper 109 affixed to each rod 105. This arrangement creates a force between frames 104, 106 to grasp board 22 when of end thereof is moved into carriage 100 as more fully described below. In an embodiment springs 107 may create a force of approximately 25 lbs., which is sufficient to grasp board 22 and pull it into roller carriage 100 or 102.

A pair of lower rollers 110, 112 may be journalled in respective bushings bracketed to respective lower support flanges 114 for rotation of lower rollers 110, 112 about respective spindles 116, 118. Each bottom roller 110, 112 may have a respective flange 113, 115 positioned at one end thereof. Flanges 113, 115 may function as a guide against which board 22 may be supported and may be used for measuring the width of board 22 as it moves in the cutting zone area.

In an embodiment of roller carriage 100 shown in FIG. 3, lower rollers 110, 112 may be driven in cooperation by a right angle gear drive 117 and a servomotor 119 mounted on lower frame 106 and connected with spindle 118. Respective pulley wheels 111 (one shown) may be mounted on respective spindles 116, 118 and coupled with a pulley belt 121. Pulley wheels 111 and pulley belt 121 may have interlocking teeth. Controller 56 may control servomotor 119 and consequently right angle gear drive 117 to drive lower rollers 110, 112 together.

In this respect, controller 56 may be programmed to execute program files for cutting pieces of lumber 22 to various lengths and having various end cuts to form truss chord and web members. Controller 56 may control lower rollers 110, 112 via servomotor 119 to linearly translate board 22 from entrance table 12 toward a cutting zone generally defined as the area between respective roller carriages 100, 102.

In an embodiment, controller 56 may control the simultaneous movement of roller carriages 100, 102 to expand and contract the cutting zone area. It may also control power saw 50 through the cutting zone in response to movement of roller carriages 100, 102 as more fully described below. Controller 56 may control servomotor 119 so that lower rollers 110, 112 index board 22 forward to and through the cutting zone in accordance with a cut list of the executable program files.

Referring again to FIG. 3, a pair of upper rollers 120, 122 may be journalled and suspended in respective bushings bracketed to respective upper support flanges 124 for rotation about respective spindles 126, 128. In an embodiment, upper rollers 120, 122 may move in cooperation at the same speed via respective pulley wheels 123, 125 mounted on respective spindles 126, 128 connected with a pulley belt 129. Upper rollers 120, 122 may move in response to lower rollers 110, 112 when board 22 is being translated through roller carriage 100. Pulley wheels 123, 125 and pulley belt 129 may have interlocking teeth.

A hollow shaft optical encoder (not shown) may be provided to monitor rotation of spindle 126 of upper roller 120 to measure movement of board 22 as it moves into roller carriage 100 and translated into and through the cutting zone. Data from the encoder may be transmitted to controller 56 using known techniques and used to further control movement of board 22 pursuant to a cut list.

Lower rollers 110, 112 and upper rollers 120, 122 may be sized and spaced apart to ensure a sufficient amount of clamping force is exerted onto board 22 for linearly translating the lumber and holding it in position when a cut is being made. At rest, upper rollers 120, 122 and lower rollers 110, 112 may be spaced approximately 1.25 inches apart. In an embodiment, opposing pneumatic cylinders 130, 132 may be attached to respective lower support flanges 114 having respective rods 134, 136 extending upwardly and attached to respective upper support flanges 124.

A proximity sensor (not shown) may be affixed to roller carriage 100 in a position to detect when the leading end of board 22 is beneath both upper rollers 120, 122. When the leading end of board 22 is beneath both upper rollers 120, 122 then exemplary pneumatic cylinders 130, 132, which may be connected to a compressed air supply (not shown) may be activated to create a tensile force between frames 104, 106. In this respect, pneumatic cylinders 130, 132 pull upper frame 104 toward lower frame 106, which consequently applies force between opposing upper and lower rollers to grip board 22 as it moves through roller carriage 100. In an embodiment, cylinders 130, 132 may create a total of approximately 400 lbs. of force on carriage 100 to hold board 22 in place when a cut is being made. When board 22 passes through the upper and lower rollers of roller carriage 100 then the motion sensor may deactivate pneumatic cylinders 130, 132 and remain in standby mode waiting for the next board. Alternate embodiments allow for pneumatic cylinders 130, 132 to be other devices that pull frames 104, 106 toward each other sufficiently to hold board 22 in place for cutting.

A total force is created by the force created by pneumatic cylinders 130, 132 between upper and lower frames 104, 106 and the force created by respective rods 105 and springs 107 when board 22 is urged between upper rollers 120, 122 and lower rollers 110, 112. This total force may vary as a function of the type and size of work piece being cut and force created by power saw 50 when making a cut. In an embodiment, pneumatic cylinders 130, 132 may be centered between vertical planes defined by spindles 116, 126 and 118, 128 respectively so that the force is substantially equally distributed among all rollers on roller carriage 110. This arrangement provides a sufficient gripping force between upper rollers 120, 122 and lower rollers 110, 112 to linearly translate board 22 through carriage 100 into the cutting zone area, and to hold board 22 in place when a cut is being made by power saw 50.

Figure 4:
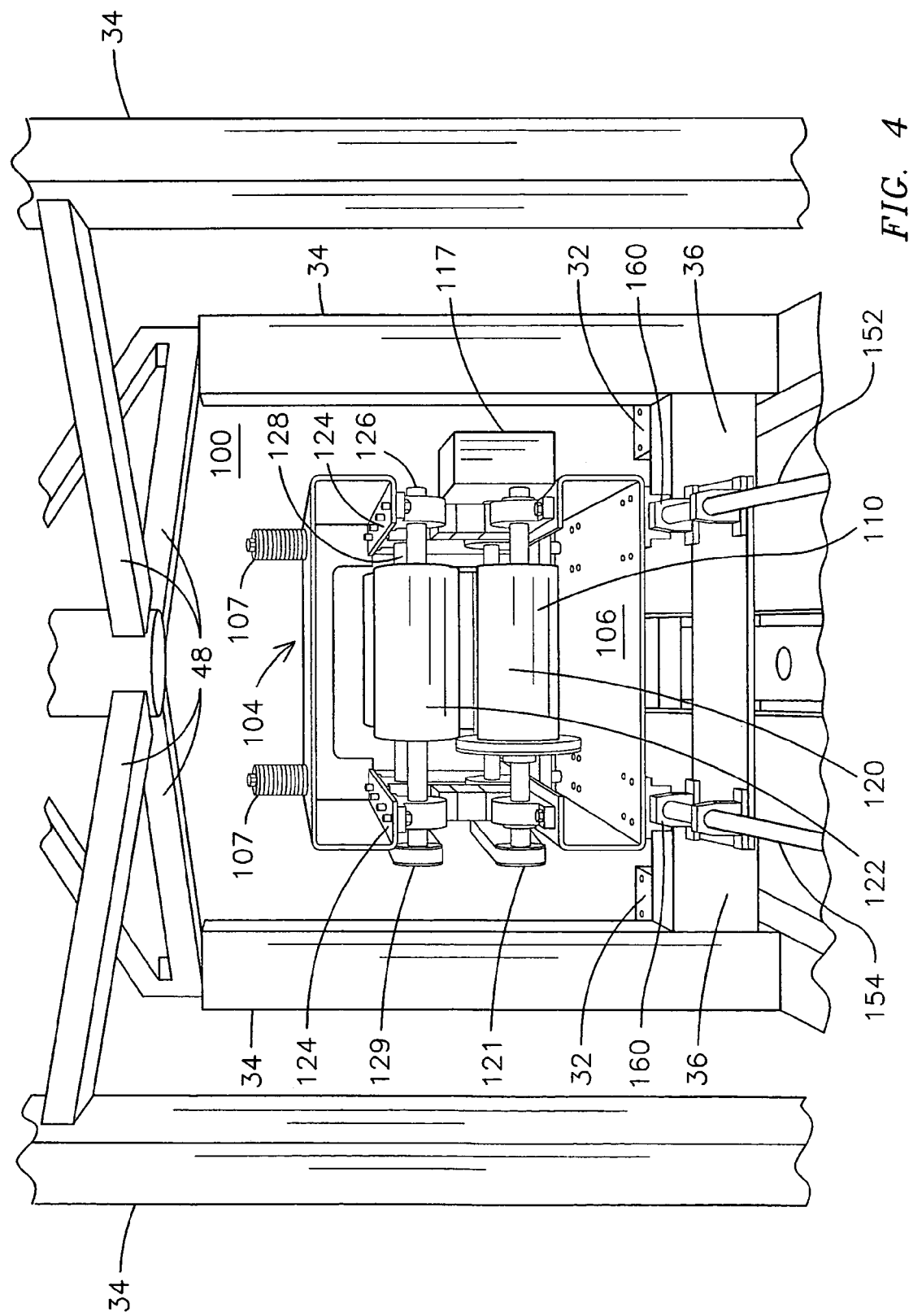
FIG. 4 is a front perspective view of the exemplary roller carriage of FIG. 3 mounted on an exemplary base frame of FIG. 1.
Figure 5:
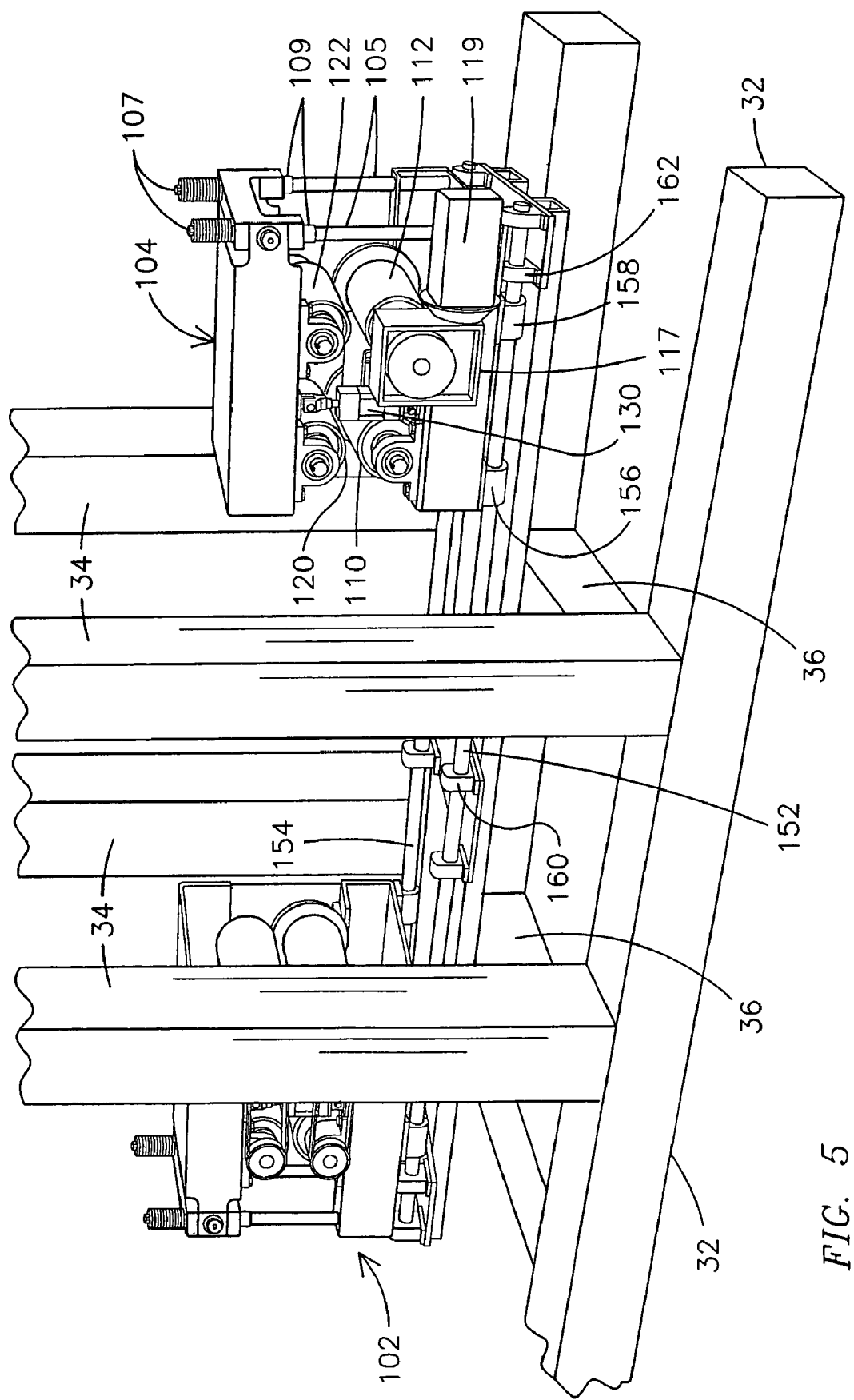
FIG. 5 is a side perspective view of two exemplary roller carriages of FIG. 3 mounted in opposing relation on the exemplary base frame of FIG. 4 in a first position.
Figure 6:
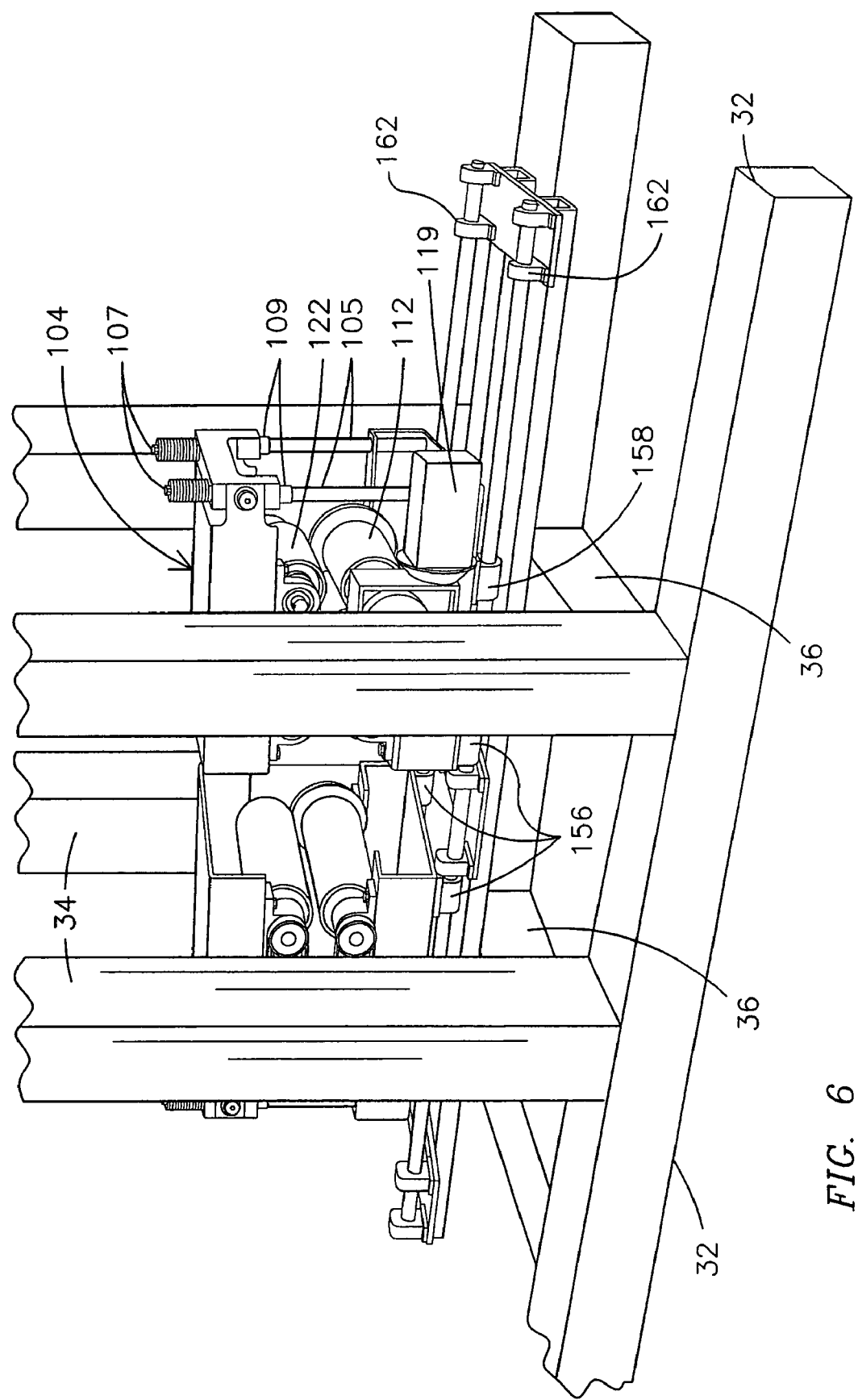
FIG. 6 is a side perspective view of FIG. 5 with the two exemplary roller carriages moved to a second position.

Returning to FIG. 1, roller carriages 100, 102 may be movably mounted to base frame 30 such as by mounting them to cross members 36 as more easily shown in FIGS. 4-6. Referring to FIG. 4, a pair of parallel guide rails 152, 154 may be affixed to cross members 36 for guiding the translation of respective roller carriages 100, 102 toward and away from each other. In an embodiment, controller 56 may be programmed to control the translation of roller carriages 100, 102 in cooperation with controlling the linear translation and rotation of power saw 50.

In this aspect, embodiments of the invention may be used to make a variety of cuts to form truss chord and web members as will be recognized by those skilled in the art. For example, embodiments of the invention may be configured to make scarf cuts, cuts at incrementing angles, and single, double or triple end cuts such as cutting a bottom end chord for a scissor truss. In an embodiment, scarf cuts may be made of up to approximately 40 inches and various cuts may be made to boards having dimensions of 2×3, 2×4, 2×6, 2×8, 2×10 and 2×12 of varying lengths.

Referring to FIGS. 1 and 2, controller 56 may be programmed to control the linear translation of power saw 50 so it traverses the length of guide bars 66. Guide bars 66 and servomotor 70 may be sized so that power saw 50 is linearly translated approximately 36 inches from one end of saw carriage 62 to the other. A conventional cutting blade 54 may have a diameter that adds approximately 4 inches to the cutting path of power saw 50 so a scarf cut of approximately 40 inches may be made in board 22. It will be appreciated that alternate embodiments have employ varying lengths of guide bars 66 and cutting blades 54 to make scarf or other cuts of varying lengths.

It can be appreciated from FIGS. 1, 5 and 6 that roller carriages 100, 102 may move in opposing directions linearly along parallel guide rails 152, 154 between contracted and extended positions. The contracted position may be when roller carriages 100, 102 are closest together (FIG. 6) and the extended position may be when they are farthest apart (FIG. 5). Controller 56 may be programmed to control the movement of roller carriages 100, 102 along guide rails 152, 154 via respective linear actuators (not shown). Roller carriages 100, 102 may be mounted to guide rails 152, 154 using exemplary guide mounts 156, 158 shown in FIGS. 5 and 6, and their travel may be limited by respective stoppers on guide rails 152, 154 such as stoppers 160, 162 shown in FIGS. 4, 5 and 6.

One aspect of the invention allows for controller 56 to control the equidistant movement of roller carriages 100, 102 along guide rails 152, 154 toward and away from each other. Roller carriages 100, 102 may be moved simultaneously toward or away from each other at the same time power saw 50 is being rotated by saw carriage 62 about shaft 67. The distance between roller carriages 100, 102 may define a cutting zone area so power saw 50 may have sufficient travel along guide bars 66 to make a cut, such as one being executed as part of a cut list. In alternate embodiments, one roller carriage 100, 102 may remain stationary as the other one moves, or they may be moved independently and different distances to define an appropriate cutting zone area.

For example, when roller carriages 100, 102 are in their contracted position, or closest together as shown in FIG. 6, then power saw 50 may be programmed to make a 90° or square cut across board 22 such as when cutting board 22 to length. Further, when roller carriages 100, 102 are in their expanded position, or farthest apart as shown in FIG. 5, then power saw 50 may be programmed to make an approximately 10° scarf cut of approximately 40 inches in length without having roller carriages 100, 102 interfere with the travel or cutting path of power saw 50. Roller carriages 100, 102 are approximately 50 inches apart in their expanded position and approximately 16 inches apart in their contracted position. As can be appreciated, the distances between roller carriages 100, 102 in their expanded and contracted position may vary in alternate embodiments of the invention.

With reference to FIG. 1, controller 56 may control the rotation of saw carriage 62 about shaft 67 so that power saw 50 may be rotated through about 360° in either a clockwise or counterclockwise direction. Controller 56 may be programmed to move roller carriages 100, 102 either toward or away from each other in response to the incremental rotation of saw carriage 62. By way of example, saw carriage 62 may be considered in its home position when its longitudinal axis is perpendicular to the longitudinal axis of board 22 being held in the cutting zone area by roller carriages 100, 102. In this position the vertical plane of cutting blade 52 is "square" to board 22 or in position to make a 90° cut across board 22 when power saw 50 is translated along guide bars 66.

Controller 56 may be programmed to independently control the servomotors driving the respective lower rollers 110, 112 on respective roller carriages 100, 102. This allows for lower rollers 110, 112 in each roller carriage 100, 102 to independently control movement of board 22 such as when board 22 extending there between is cut in half. In this respect, roller carriage 102 may independently translate the half of board 22 being held by the carriage onto exit table 14. Roller carriage 100 may then be independently controlled to translate the other half of board 22 from roller carriage 100 to roller carriage 102, which may hold board 22 in place in conjunction with roller carriage 100 or translate board to exit table 14.

These servomotors may also independently control the direction rollers 110, 112 are rotating within each respective roller carriage 100, 102. This allows reversing the direction the rollers rotate, such as when roller carriages 100, 102 are moving toward or away from each other while holding board 22. For example, board 22 may be initially indexed into a cutting position and held in place between roller carriages 100, 102 when they are in their expanded or farthest apart position. From this position, controller 56 may be programmed to control movement of roller carriages 100, 102 toward each other into their contracted or closest position. This position may be selected to make various cuts such as when making a 90° cut across board 22 or cutting short pieces of approximately 5 or 6 inches in length, for example.

With roller carriages 100, 102 in their contracted position, board 22 may be incrementally fed or indexed from carriage 100 to carriage 102 to cut board 22 into short pieces of about 9 inches in length that have square cuts on both ends. It will be appreciated that embodiments of the invention have great versatility for making a wide range of cuts and cutting boards 22 to various lengths with a high degree of throughput. It will also be appreciated that roller carriages 100, 102 exert sufficient force on board 22 that a cut may be made to the board while being held by only one carriage 100, 102.

It is desirable, although not necessary to have roller carriages 100, 102 as close as possible during a cut while allowing room for power saw 50 to travel its cutting path. This stabilizes board 22 near where a cut is being made. When roller carriages 100, 102 move toward their contracted position from the expanded position while holding board 22 in place, the direction respective lower rollers 110, 112 rotate may be controlled so that as roller carriages 100, 102 move toward one another board 22 remains stationary relative to its cutting position. In this example, respective lower rollers 110, 112 of roller carriages 100, 102 would rotate in opposite directions. It will be appreciated that respective upper rollers 120, 122 may rotate freely in response to movement of board 22, or movement of roller carriages 100, 102 when board 22 is being held stationary there between.

Controller 56 may be programmed to control the simultaneous and equidistant movement of roller carriages 100, 102 in response to incremental degrees of rotation of cutting blade 54 on saw carriage 62. Roller carriages 100, 102 may be in their contracted position when saw carriage 62 is in its home position for making a 90° cut across board 22. The farther saw carriage 62 is moved away from this 90° cutting position, in either the clockwise or counterclockwise direction the farther roller carriages 100, 102 will move apart from each other. In this respect, in an embodiment of the invention the movement of roller carriages 100, 102 toward and away from each other may be directly proportional with the rotation of saw carriage 62. Alternate embodiments allow for this relationship to be nonlinear depending on the size of the work piece and length cut being made.

The distance roller carriages 100, 102 move in response to each incremental degree of saw carriage 62 rotation may be predetermined and stored in a database or programmed into controller 56. When saw carriage 62 is in a 0° position, i.e., when the vertical plane of cutting blade 54 is parallel to the longitudinal axis of board 22, roller carriages 100, 102 may be in their expanded or farthest apart position. The distance roller carriages 100, 102 move in response to rotation of saw carriage 62 may be a function of the distance power saw 50 needs to travel to make a cut, taking into account the size of cutting blade 54. Controller 56 may control movement of roller carriages 100, 102 by sending signals to linear actuators mounted for translating respective roller carriages 100, 102 along guide rails 152, 154.

Embodiments of the invention allow for the independent control of the rotation of saw carriage 62, linear translation and vertical displacement of power saw 50 and movement of roller carriages 100, 102. This combination of independent controls provides great flexibility in making cuts to work pieces such as board 22, and managing work piece flow. For example, the rotation of saw carriage 62, and the linear translation and vertical displacement of power saw 50 allow for power saw 50 to approach board 22 at any cut angle from either side of board 22.

Further, embodiments of the invention are advantageous because vertically displacing power saw 50 on an arc while simultaneously controlling the linear displacement of power saw 50 reduces the linear displacement distance needed to make a cut, such as a square cut across board 22, for example. When the means 80 for vertically displacing power saw 50 is in its retracted or "up" position, blade 54 may be raised completely above board 22 with at least a portion of blade 54 over top of board 22. This allows for blade 54 to approach board 22 in a manner similar to a "chop" saw to make a cut. Blade 54 may be above board 22 and descend into board 22 on an arc before or while power saw 50 is being translated linearly. The same relationship exists when blade 54 is ascending out of board 22 during completion of a cut. When the cut is completed power saw 50 may be retracted vertically to its "up" position so the blade 54 is above board 22 with at least a portion of blade 54 over top of board 22. This reduces the distance power saw 50 must travel to make a cut and allows for board 22 to move linearly between roller carriages 100, 102 at the same time power saw 50 is being linearly translated back to its home or other position.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. An apparatus for cutting a work piece, the apparatus comprising:
    a base frame comprising upwardly extending supports defining a workflow path there between;
    a framework mounted to the base frame;
    a rotatable carriage mounted to the framework above the workflow path;
    at least one guide rail mounted to the rotatable carriage;
    a power saw movably mounted to the at least one guide rail; and
    a controller programmed for independently controlling rotation of the rotatable carriage and translation of the power saw along the at least one guide rail; a pair of guide rails mounted to the base frame extending longitudinally through the workflow path;
    a first roller carriage movably mounted to the pair of guide rails on an in-feed side of the power saw;
    a second roller carriage moveably mounted to the pair of guide rails on an out-feed side of the power saw;
    and the controller programmed to control movement of the first and second roller carriages between a contracted position and an expanded position.

2. The apparatus of claim 1 further comprising:
    a pair of upper rollers mounted for rotation to an upper frame of the first roller carriage;
    a pair of lower rollers mounted for rotation to a lower frame of the first roller carriage;
    a pulley connecting the pair of lower rollers together for simultaneous rotation;
    a right angle gear drive connected to one of the pair of lower rollers; and
    a servomotor connected to the right angle gear drive.

3. The apparatus of claim 2 further comprising:
    a pair of pneumatic cylinders connected at opposing ends to the upper frame and the lower frame respectively;
    a pair of rods connecting the upper frame with the lower frame; and
    a spring mounted to an upper end of each rod for biasing the upper frame and the lower frame toward each other.

4. The apparatus of claim 1 further comprising:
    means mounted to the rotatable carriage for vertically displacing the power saw between an upper position and a lower position.

5. The apparatus of claim 4 further comprising:
    a pair of guide rails mounted to the base frame extending longitudinally through the workflow path;
    a first roller carriage movably mounted to the pair of guide rails on an in-feed side of the power saw;
    a second roller carriage moveably mounted to the pair of guide rails on an out-feed side of the power saw; and
    the controller programmed to control the simultaneous movement of the first and second roller carriages between a contracted position and an expanded position in response to rotation of the rotatable carriage.

6. An apparatus for cutting a work piece, the apparatus comprising:
    a frame;
    a power saw;
    means for linearly translating the power saw through a cutting zone area, the means for linearly translating rotatably mounted to the frame above the cutting zone area; and
    a controller programmed to independently control linear translation of the power saw and rotation of the means for linearly translating the power saw through the cutting zone; a pair of roller carriages movably mounted to the frame for holding a work piece in the cutting zone area; and
    the controller programmed to control movement of the pair of roller carriages.

7. The apparatus of claim 6 further comprising:
    means for vertically displacing the power saw; and
    the controller programmed to independently control linear translation of the power saw, rotation of the means for linearly translating the power saw through the cutting zone and vertical displacement of the power saw.

8. The apparatus of claim 6 further comprising:
    the controller programmed to control movement of the pair of roller carriages in response to rotation of the means for linearly translating the power saw through the cutting zone.

9. The apparatus of claim 6 further comprising:
    at least one of the pair of roller carriages comprising an upper frame spaced from and connected with a lower frame;
    a pair of lower rollers journalled in respective bushings connected to the lower frame;
    a pair of upper rollers journalled in respective bushings connected to the upper frame; and
    a pair of pneumatic cylinders connecting the upper frame and lower frame with the pair of pneumatic cylinders connected on opposing sides of the roller carriage.

10. The apparatus of claim 9 further comprising:
    the at least one of the pair of roller carriages further comprising a pair of rods connecting the upper frame with the lower frame; and
    a spring mounted to an upper end of each rod for biasing the upper frame and the lower frame toward each other.

11. The apparatus of claim 6 further comprising:
    means for vertically displacing the power saw;
    a pair of roller carriages movably mounted to the frame for holding a work piece in the cutting zone area; and
    the controller programmed to control movement of the pair of roller carriages.

12. The apparatus of claim 11 further comprising:
    the controller programmed to control movement of the pair of roller carriages toward and away from each other an equal distance in response to an incremental rotation of the means for linearly translating the power saw through a cutting zone.

* * * * *